Patented Feb. 12, 1935

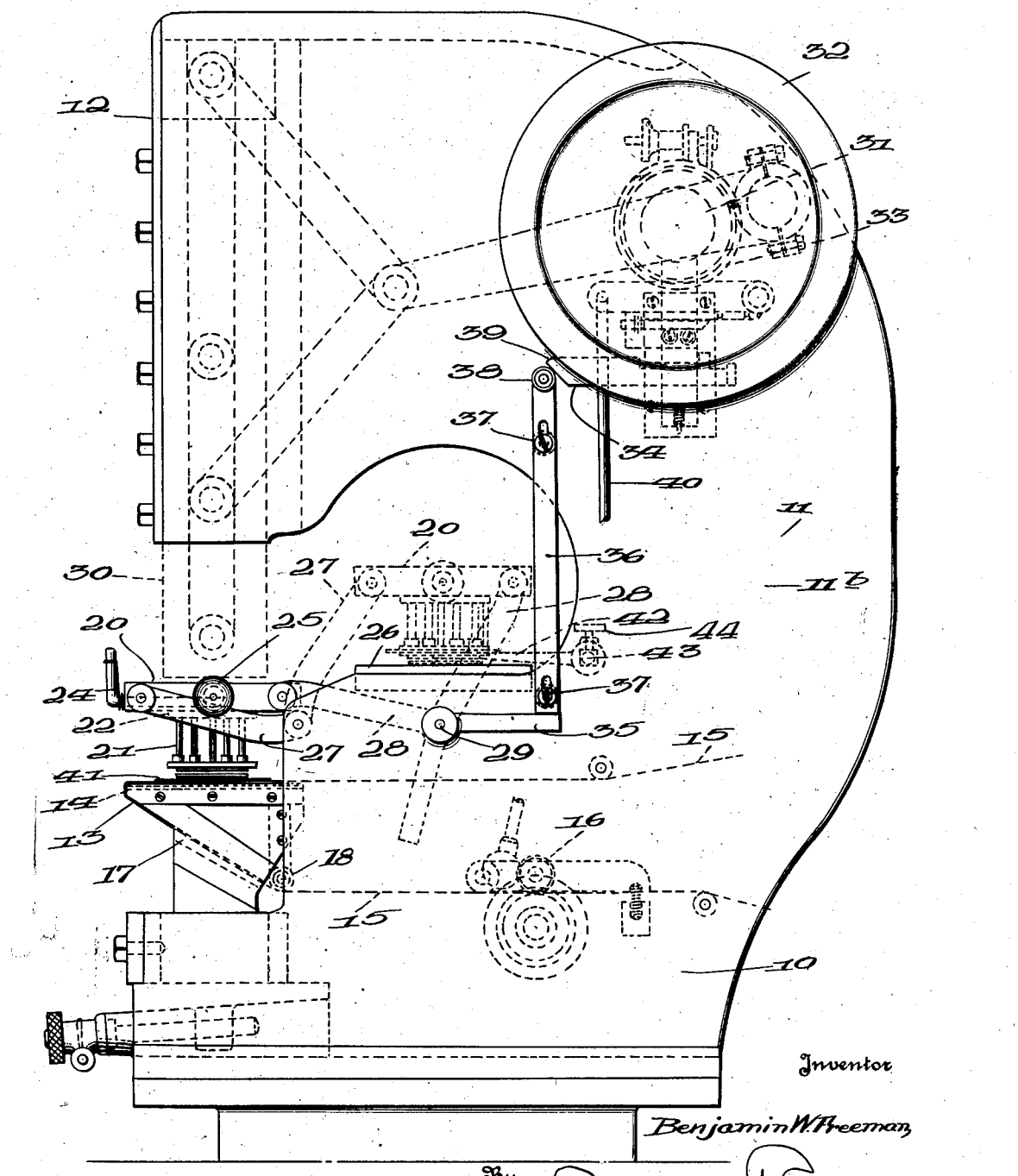

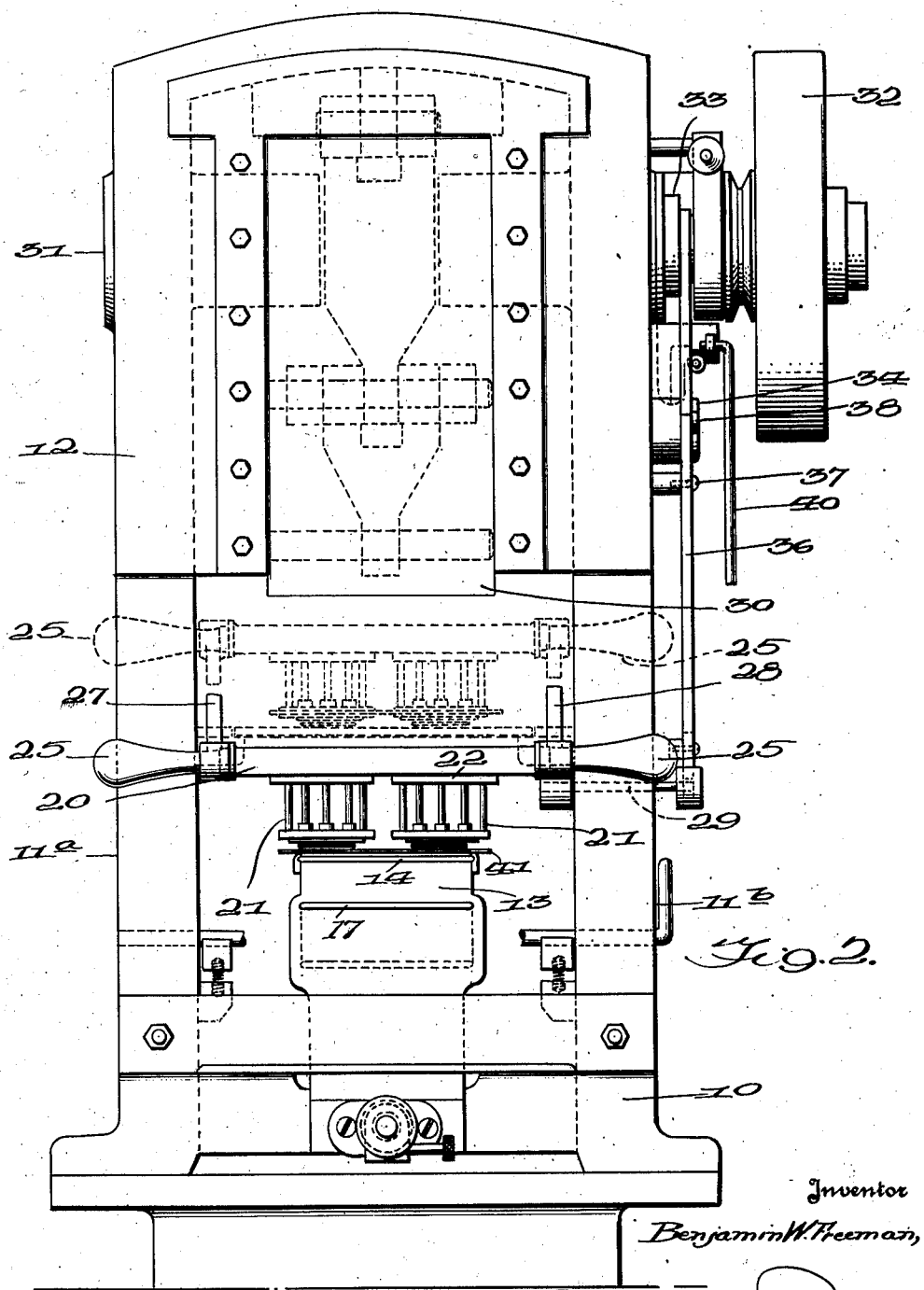

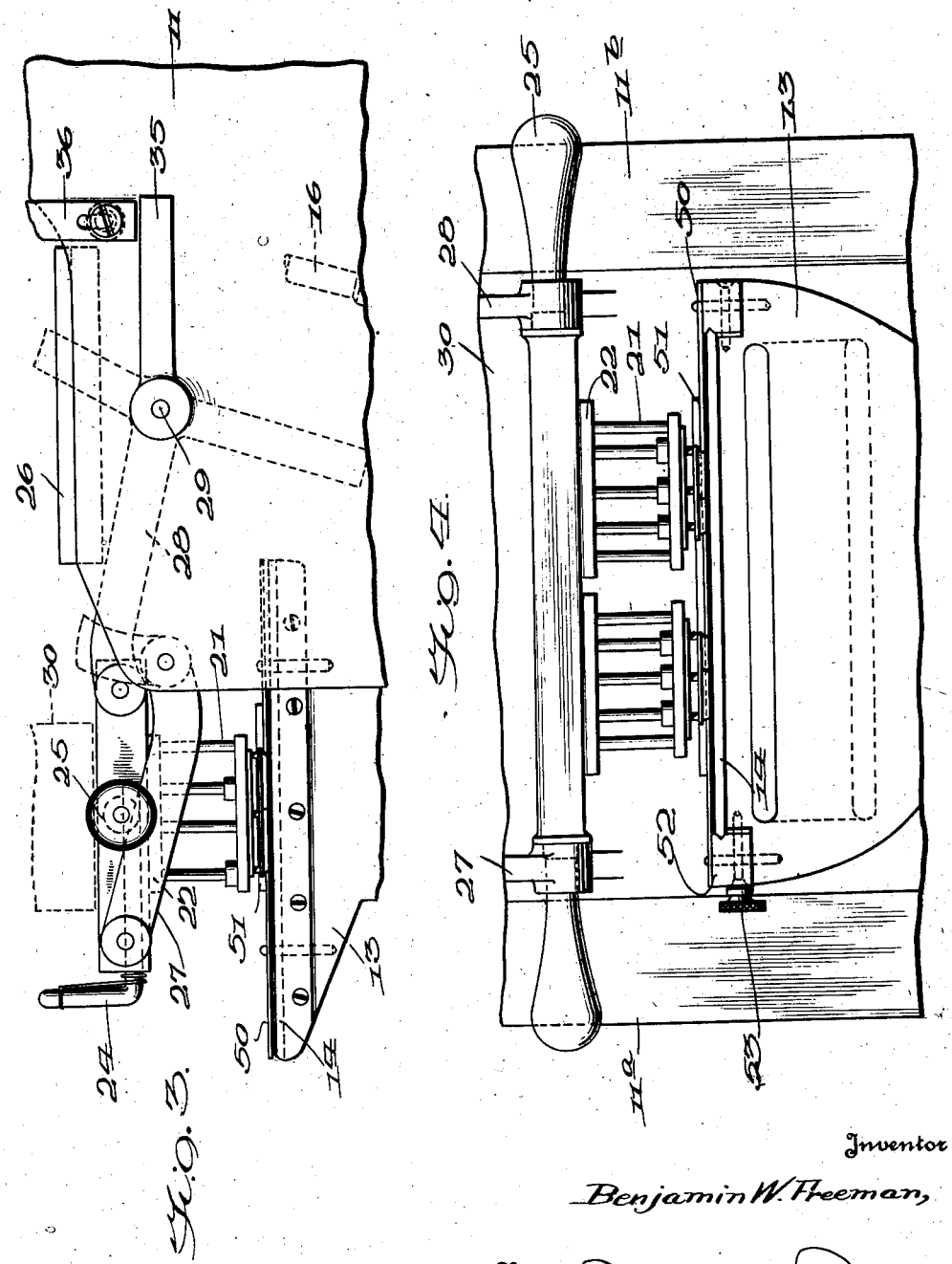

1,990,596

UNITED STATES PATENT OFFICE 1,990,596

ORNAMENTING MACHINE

Benjamin W. Freeman, Cincinnati, Ohio

Application September 17, 1931, Serial No. 563,430

25 Claims. (Cl. 101—301)

This invention relates to improvements in shoe ornamenting machinery and more particularly to combined marking and cutting machines adapted for operation upon skins, upper blanks, fitted and closed uppers, or the like, in which the work is marked with an ink or pigment at the same time, or as a part of a continuous cycle of operations, during which the work is ornamented by perforating or cutting out a design therein.

Among the objects of the invention are the formation of ornamental designs in the work by the application of a stamped or printed marking which may simulate stitching, or may take the form of a design; by the production of ornamental cutouts in the work, or by combinations of marking and cutting to produce an ornamental pattern, and in marking and cutting simultaneously, or in predetermined order during a continuous cycle of operations.

Another object contemplates the application of markings to the work which may be used as a guide for subsequent operations, such as stitching, or aligning of other shoe parts with respect to the marked part.

The machine illustrated herein utilizes a work support normally held in fixed position relative to the frame of the machine, but which is adaptable to movement if convenience desires, which support is designed to accommodate various kinds of work, either flat skins, flat blanks or ring-like shoe parts, such as closed and fitted uppers. Means is provided for moving a combined marking and cutting die unit into and out of operative engagement with the work. This means in the preferred embodiment is power operated and the unit is arranged in the path of movement of the power operated means. In some instances, a manual or treadle operating means may be more effective and it is contemplated that this machine may be readily adapted to the use of such means in lieu of a power mechanism.

A further object of the present invention is to provide means for moving the die independently of its actuating means, from a position in the path of such means, where it may be utilized for ornamenting the work, to a position where ink may be applied, and back again to ornamenting position, and to this end there is provided a novel link supporting mechanism by means of which the die may be carried from its operating position to its inking position. An advantage of having the die mounted independently of its actuating means resides in the additional safety afforded the operator while placing the work on the support and it should be further noted that once the work is placed in position in this machine it is not moved, thus avoiding any possibility of shifting of the work after it is once positioned.

While ink is generally used as an ornamenting medium, this machine operates with equal facility when other ornamenting materials are used, examples thereof being pigment, gold leaf, silver leaf, etc., and use of the term "ink" hereinafter and in the claims is intended to include any such equivalent material.

Various safety mechanisms, ensuring a predetermined cycle of operations and designed to minimize injury to an operator or to the work by preventing premature movement of the mechanism which actuates the die during ornamenting operations, form a feature of the invention, these safety mechanisms including a clutch locking mechanism and a control means synchronized with the die for ensuring operation of the clutch at predetermined points in the normal cycle of operation, and effective to prevent application of power to the die actuating mechanism until the work has been properly positioned on its support, and the die properly inked and located in ornamenting relation to the work.

This invention also contemplates the use of a gauge means for ensuring proper positioning of the work on its support relative to the die. Such gauge means may take the form of abutments or the like on the support, in which event it has been found desirable to utilize a combined gauging member and backing member for the die, means also being disclosed for adjustably attaching this device in position.

In another form the gauge may be in the nature of a mask having edge portions adapted for super-position on the work. It is an object of this structure, when a mask is used, to provide means effective to prevent contacting of the gauge mask with the ink at such times as the die is being inked.

To the attainment of the foregoing and other objects which will appear as the description proceeds, reference may be made to the accompanying drawings, in which Fig. 1 is a side elevation of the machine;

Fig. 2 is a front elevation thereof;

Fig. 3 is an enlarged, fragmentary side elevation of the die and ink applying mechanism but illustrating a slightly modified work support; and Fig. 4 is an enlarged fragmentary front elevation of the structure shown in Fig. 3.

In the preferred embodiment of the invention, herein disclosed, there is described a machine having a power driven plunger cooperating with a die unit which is mounted for movement into the path of the plunger and thereafter movable by the plunger to ornament the work, and a work support on which the work is positioned, with a backing member of paper, or its equivalent, between the work and the support.

In order to properly align, gauge and position the work, with respect to the die, there is provided a gauge mask resiliently attached to the die. This mask is preferable for use with some types of die, but an alternate style of gauge in the form of work positioning abutments on the support itself is also disclosed, for use either in conjunction with or in lieu of such mask.

Referring more specifically to the drawings in which like reference numerals designate like parts, it will be observed that the machine comprises generally a base 10 having an upwardly extending frame or casing 11 which terminates in a head portion 12 overhanging the front part of the base to provide an enclosure or throat within which is mounted a work support or anvil 13. The anvil is preferably surfaced over its top with a plate 14 providing a protective backing for the cutting edges of the die, the plate being made of brass, soft steel or other material softer than the cutting edges of the die, rubber composition, fibre or the like. A strip of backing paper 15 is fed step by step over the plate 14, a feed mechanism 16 being provided for the purpose, the function of the paper being to ensure a clean cut in the work. The paper is not absolutely necessary and may be removed, but is very desirable with most work.

When operating upon fitted work, it is important that a clearance be provided around the work support, in order to properly drape the work thereabout and maintain the surface upon which an operation is to be performed, flat and smooth across the surface of the support, and it is for this purpose that the work support is anvil-shaped, i. e. provided with a horn projected therefrom. Obviously then, the path of the backing material 15 must be such as not to defeat the purposes of the clearance about the work support. To this end, (as shown in Figs. 1 and 2) the anvil is cored out at 17 and the backing paper disposed to travel across the upper surface of the anvil, that is over the plate 14, down and under the horn of the anvil, through the cored out portion 17, over an idler roll 18 and thence to the feed mechanism 16, it being understood that this paper is drawn from a supply roll, not shown, and is fed to a rewind roll, not shown, such rolls being well known in the art. With this arrangement, the paper closely follows the contour of the anvil and does not, in any manner, interfere with the placement of work thereon.

The machine is equipped with an ink marking and tracing die holder 20, to which a pair of die units 21 may be attached. The units include cutting edges, and a plate having marking edges resiliently spaced in advance of the cutters, and may be attached to a base member 22 which is provided with a wedge-shaped groove locked on to the holder 20 by means of a cam lever 24 working in said groove, the foregoing structure being fully described and claimed in a copending application, Serial No. 563,427 of even date herewith. The die holder 20 is also provided with a handle 25 on each side, by means of which the operator can move the die from its position over the work support 13 to a position adjacent an ink pad 26. The die holder moves in parallel horizontal planes, this movement being controlled by pairs of links or levers 27, 28. One such pair is located on each side of the holder, the links 28 being keyed to a shaft 29 extending transversely through the frame and projecting outside of the walls 11a and 11b of the casing, and it will be seen from Fig. 2 that the entire movement of the die and die holder is within the two walls.

A plunger 30 is mounted for vertical reciprocating movement in the head 12 of the machine, this plunger being connected by a crank arm and suitable linkage to a main power shaft 31. Power is supplied to the shaft by a continuously rotating pulley 32 which may be connected to the shaft by a one revolution clutch mechanism 33. This clutch is provided with a lock or key 34 which prevents the clutch from actuating the shaft 31 until such time as the key is moved to unlocking position.

During the normal operation of the machine the die will be moved back into engagement with the ink pad and then moved forward to a position adjacent the work. As the die reaches this position, an extension 35 keyed to a projecting end of shaft 29, for movement with the link 28 will engage a sliding bar 36 and move same vertically upward to the position indicated in Fig. 1. The bar 36 is attached by a pin and slot mounting 37 to the wall 11b of the frame and carries a roller 38 at its upper end. The roller 38 is positioned for engagement with a cam face 39 on the key 34, and it will be evident that as the bar moves vertically, the key 34 will slide horizontally in accordance with the direction of movement of the bar 36. Suitable spring means (not shown), effective to keep the key 34 in engagement at all times with the roller 38, form part of the clutch mechanism. As soon as the key 34 has been moved to clutch releasing position, as indicated at Fig. 1, the machine is free to be treadled, and depression of the treadle rod 40 actuates the clutch 33 thereby initiating actuation of the plunger 30. When the plunger 30 moves down, it strikes the top side of the die holder 20, forcing the marking die against the work, and the cutting die through the work. The clutch 33, being a one revolution clutch, will cause the shaft 31 to complete its revolution and the plunger 30 to return to inoperative position after the ornamentation of the work, and will then de-clutch the shaft from the pulley 32. Subsequent movement of the die toward the ink pad will, through movement of the bar 36 and key 34, lock the clutch so that it cannot be treadled until the die has again reached a position adjacent the work.

Reference may be made to my co-pending application Serial No. 478,264, filed August 27, 1930 for details of the clutch and actuating mechanism connecting the plunger thereto.

In order to ensure accurate positioning of the work on the support 13 in alignment with the die, a mask 41 is provided, resiliently attached to the die and normally spaced in advance of the lowermost edge of the marking plate a sufficient distance to permit proper aligning and gauging of the work, without the die unit touching the work. This mask may be formed with gauge abutments or with openings in a manner similar to the mask illustrated in the above mentioned patent, the work being positioned with respect to some predetermined portion of the mask.

When the die unit is depressed by the plunger 30, the cutting edges will pass through or around the marking plate, and both cutting and marking edges thereof will pass either through suitable openings, or around the mask, which is mounted resiliently on the die unit, depending upon the design.

When the die is moved back to ink marking position the mask must be moved to a position where it will not touch the ink pad, and to accomplish this a series of rods 42, which may be moved quickly into any lateral position necessary to cooperate with various types of dies, may be utilized. These rods are held in a horizontal position on a square spindle 43, which extends transversely through the casing 11 and by means of a knurled screw 44 are held tight but may be loosened for shifting. The upper faces of the rods 42 are so located that only the gauge mask strikes the rods and the mask is held in that position while the die unit travels down past the mask into contact with the ink pad 26.

In the above described form of the invention, particularly illustrated in Figs. 1 and 2, the support 13 and plate 14 are shaped to accommodate fitted work of relatively small size, although flat work may be treated thereon, and the mask 41 which may be hinged to the support, or may be carried by the die, or otherwise associated with the machine is utilized. In Figs. 3 and 4 is illustrated a slight modification wherein the work support 13 is somewhat wider and is arranged to mount a work positioning plate 50 carrying solid edge gauge abutments 51, against which the work is placed, the abutments being used in lieu of the mask 41. The plates 50 and 41 function alike and may be removed or inserted according to the type of die used in the machine, it being noted that 50 is wider than 41 and thus more suitable to flat work, or larger sizes of fitted work particularly as it carries the abutments 51. The work will be positioned against the abutments 51 when the die is removed from the support, the operation of the machine being otherwise as described in connection with Figs. 1 and 2. If a solid edge gauge is used on the work support, in lieu of the mask on the die, there will be no need for the rods 42 and they may be either removed or shifted out of the way.

When the plate 14 has been struck by the die a number of times, it may become scored or indented and in order to get the proper kind of work, the plate is made shiftable so that different surface positions can be presented. To this end a clamp 52 is utilized, this clamp being held in position by a set screw 53. By loosening the set screw the clamp 52 releases its hold on the plate 14, which may then be shifted as desired.

The plate 50 can be used as a backing member, but it is not shifted as that would change the location of the work.

From the foregoing description the operation of the entire machine will be readily apparent. Work is placed upon the support and aligned with the die by means of the gage 41 or 50, the machine is treadled and the plunger descending, causes the die unit 21 to ornament the work. It is pointed out that the cutting and marking die of this machine is mounted independently of the pressing member or plunger 30 and is movable from work operating position to inking position manually by the operator. The position of the die controls the operation of the clutch which initiates actuation of the plunger. Inasmuch as the die is manually moved into contact with the inking pad, the operator may, by increasing or decreasing pressure against the pad, control the amount of ink applied to the die.

Having thus described my invention, what I claim as new and desire to secure by Letters Patent of the United States, is:—

1. An ornamenting machine comprising a work support, a combined marking and cutting die unit, means to apply ink to said die unit, power driven means for moving said die unit into ornamenting relation to a piece of work on said support, and means to move said die unit from a position adjacent said work support to a position adjacent said ink applying means, and out of the path of movement of said power means.

2. An ornamenting machine comprising a work support, means to properly position a piece of work relative to said support, a combined marking and cutting die unit, means to apply ink to said unit, means to move said die unit into ornamenting relation to said work piece and means to move said die unit from a position adjacent said work support to a position adjacent said ink applying means, and out of the path of movement of said first die moving means.

3. An ornamenting machine comprising a work support, means mounted on said support to properly position a piece of work, a combined marking and cutting die unit, normally aligned with said work positioning means, means to apply ink to said unit, means to move said die unit into ornamenting relation to said work piece, and means to move said die unit from a position adjacent said work support to a position adjacent said ink applying means, and out of alignment with said work positioning means.

4. An ornamenting machine comprising a work support, a combined marking and cutting die unit, means carried by said unit to properly position a piece of work in alignment with said unit, means to move said die unit into operative engagement with said work piece means to apply ink to said unit and means to move said die unit from a position adjacent said work support to a position adjacent said ink applying means and out of alignment with the work on said support.

5. An ornamenting machine comprising a work support means to properly position a piece of work on said support a combined marking and cutting die unit means to apply ink to said unit power driven means to move said die unit into operative engagement with said work piece, means to move said die unit from a position adjacent said work support to a position adjacent said ink applying means, and means to lock said power driven means against movement when said die unit is removed from its position adjacent the work.

6. An ornamenting machine comprising a work support, a pressure applying member movable toward and from said support, a combined marking and cutting die unit operatively positioned between said plunger and said support, ink applying means for said unit, means to move said die unit from its operative position, into engagement with said ink applying means and back into operative position, means to actuate said pressure member, and means movable with said die unit to lock said member actuating means against movement when the unit is removed from its operative position.

7. An ornamenting machine comprising a pressure member, a combined marking and cutting die unit normally located in the path of travel of said member, and means supporting said unit for movement out of and into said path of travel comprising links movably connecting said unit to the frame of the machine, and means to move said unit.

8. An ornamenting machine comprising a pressure member, a combined marking and cutting die unit normally located in the path of travel of said movement, and means supporting said unit for movement out of and into said path of travel comprising links pivotally connected to said unit and to the frame of the machine, and means to move said unit through parallel horizontal planes about said pivots.

9. An ornamenting machine comprising a pressure member, a combined marking and cutting die unit normally located in the path of travel of said member, ink applying means for said unit, and means supporting said unit for movement from the path of travel of the member, to the ink applying means, comprising links movably connecting said unit to the frame of the machine, and means to move said unit.

10. An ornamenting machine comprising a pressure member, a combined marking and cutting die unit normally located in the path of travel of said member, ink applying means for said unit, and means supporting said unit for movement from the path of travel of the member, to the ink applying means, comprising links pivotally connected to said die unit and to the frame of the machine, and means to move said unit through parallel horizontal planes about said pivots.

11. An ornamenting machine comprising a frame, a work support, a combined marking and cutting die unit comprising a die holder, cutting and marking dies carried thereby, power driven means for moving said die unit into ornamenting relation to a piece of work on said support means pivotally connecting said holder to said frame, means to swing said holder from an operative ornamenting position, on the pivot means, to an inoperative position out of the path of movement of said power means, means to position a piece of work on said support when said unit is in its inoperative position, and means to apply ink to said unit when in said inoperative position.

12. An ornamenting machine comprising a work support, a combined backing member and work positioning gauge on said support, a combined marking and cutting die unit and ink applying means therefor; means to move said die into operative engagement relative to said support, and means to move said die unit from a position adjacent said work support to a position adjacent said ink applying means.

13. An ornamenting machine comprising a work support, means to properly position a piece of work relative to said support, a combined marking and cutting die unit, means to apply ink to said unit, power driven means; including a clutch, to move said die unit into operative engagement to said work piece, means to move said die unit from a position adjacent said work support to a position adjacent said ink applying means, clutch locking means, and a lever movable in synchronism with said die to engage said clutch locking means and thereby lock said clutch and power driven means against movement when said die unit is removed from its position adjacent the work.

14. A machine for ornamenting shoe parts comprising a frame, a work support, a combined backing member and work positioning gauge on said support, said support and member being so disposed relative to said frame as to provide clearance spaces between the support and frame whereby shoe parts may be draped about the support; a combined marking and cutting die unit and ink applying means therefor, means to move said die into operative engagement with work on said support, and means to move said die unit from a position adjacent said support to a location adjacent said ink applying means.

15. An ornamenting machine comprising a work support, a combined marking and cutting die unit, a backing member for said die unit, fixed to said support, means to apply ink to said die unit, means to move said die unit into operative engagement with work on said backing members, and means to move said die unit from a position adjacent said backing members to a position adjacent said ink applying means, and out of the path of movement of said first die moving means.

16. An ornamenting machine comprising a work support, a combined marking and cutting die unit, a combined backing member and work positioning gauge, means to adjustably attach said member and gauge to said support, means to apply ink to said die unit, means to move said die into operative engagement with work on said support, and means to move said die unit from a position adjacent said support to a position adjacent said ink applying means, and out of normal position relative to said work positioning gauge.

17. An ornamenting machine comprising a work support, a combined marking and cutting die unit, means carried by said unit to properly position a piece of work relative to said support, means to move said die unit into operative engagement with said work piece, means to apply ink to said die unit, means to move said die unit from a position adjacent said work support, into contact with said ink applying means, and means to hold said work positioning means from contact with said ink applying means.

18. An ornamenting machine comprising a work support, a combined marking and cutting die unit, a gauge mask carried by said die unit effective to properly position a piece of work relative to said support, means to move said die unit into operative engagement to said work piece, means to apply ink to said unit, means to move said die unit from a position adjacent said work support into contact with said ink applying means, and an adjustable arm mounted in the machine for engagement with said mask during the movement of the unit toward the ink applying means thereby to hold said mask from contact with said inking means.

19. An ornamenting machine comprising a pressure member, actuating mechanism therefor, a combined marking and cutting die unit normally located in the path of travel of said member, and means supporting said unit for movement out of and into said path of travel comprising links movably connecting said unit to the frame of the machine, means to move said unit, and means movable in synchronism with said unit and effective to lock the actuating means for said pressure member against movement when said die unit is removed from the path of travel of said member.

20. An ornamenting machine comprising a pressure member, a combined marking and cutting die unit normally located in the path of travel of said member, means supporting said unit independently of said pressure member, for movement out of and into said path of travel, comprising links movably connecting said die unit to the frame of the machine, and means to move said die unit; actuating mechanism for said pressure member including a clutch, locking means therefor, a lever movable in synchronism with said links, a second lever engageable thereby and effective to engage said clutch locking means whereby to lock said pressure member and actuating means against movement when the die unit is removed from the path of travel of said member.

21. An ornamenting machine comprising a work support, a movable combined marking and cutting die unit, power actuated means to move said unit, means to align a piece of work on said support and relative to said unit, means to apply ink to said unit, said unit being mounted for movement into ornamenting relation to the work and for movement from a position adjacent the work to ink applying position.

22. An ornamenting machine comprising a work support, a movable combined marking and cutting die unit, power actuated means to move said unit, means to align a piece of work on said support and relative to said unit, means to apply ink to said unit, said unit being mounted for movement into ornamenting relation to the work and for movement from a position adjacent the work to ink applying position, and means to restrain said power means from actuation until the work piece and unit are in operating alignment.

23. An ornamenting machine comprising a work support, a combined marking and cutting die unit mounted for movement into ornamenting relation to work on said support, means to align a piece of work on said support with respect to said die unit, means to apply ink to said unit, means to move said die unit from an operative position adjacent the work to a position adjacent the ink applying means and to return same, means to actuate said unit to ornament the work and means to restrain said actuating means against movement until the work and unit are accurately aligned relative to each other.

24. An ornamenting machine comprising a work support, a movable, combined marking and cutting die unit, means to align a piece of work on said support and relative to said unit, an inking pad adjacent the path of movement of said unit for applying ink to said unit, said unit being mounted for movement into ornamenting relation to the work and for movement from a position adjacent the work to a position where the marking elements of the die will contact with the ink pad.

25. An ornamenting machine comprising a work support, a movable, combined marking and cutting die unit, means to align a piece of work on said support and relative to said unit, a stationary inking pad adjacent the path of movement of said unit for applying ink to said unit, said unit being mounted for movement into ornamenting relation to the work and for movement from a position adjacent the work to a position where the marking elements of the die will contact with the ink pad, and manually operable means for moving said unit into and out of ink applying position.

BENJAMIN W. FREEMAN.